(12) United States Patent
Chehab

(10) Patent No.: US 12,152,291 B2
(45) Date of Patent: Nov. 26, 2024

(54) PROCESS FOR MANUFACTURING AN ALUMINUM-CHROMIUM ALLOY PART WITH SUPERIMPOSED SUCCESSIVE SOLID METALS LAYER

(71) Applicant: C-TEC Constellium Technology Center, Voreppe (FR)

(72) Inventor: Bechir Chehab, Voiron (FR)

(73) Assignee: C-TEC Constellium Technology Center, Voreppe (FR)

( * ) Notice: Subject to any disclaimer, the term of this patent is extended or adjusted under 35 U.S.C. 154(b) by 1005 days.

(21) Appl. No.: 16/968,048

(22) PCT Filed: Feb. 7, 2019

(86) PCT No.: PCT/FR2019/050269
§ 371 (c)(1),
(2) Date: Aug. 6, 2020

(87) PCT Pub. No.: WO2019/155165
PCT Pub. Date: Aug. 15, 2019

(65) Prior Publication Data
US 2021/0032727 A1    Feb. 4, 2021

(30) Foreign Application Priority Data
Feb. 8, 2018   (FR) ........................................ 1870138

(51) Int. Cl.
*C22C 21/00*    (2006.01)
*B22F 3/24*    (2006.01)
(Continued)

(52) U.S. Cl.
CPC ................ *C22C 21/00* (2013.01); *B22F 3/24* (2013.01); *B22F 10/00* (2021.01); *B22F 10/25* (2021.01);
(Continued)

(58) Field of Classification Search
CPC ......... C22C 21/00; C22C 1/0416; B22F 3/24; B22F 10/00; B22F 10/25; B22F 10/64;
(Continued)

(56) References Cited

U.S. PATENT DOCUMENTS

| 11,692,240 B2 * | 7/2023 | Chehab ................... C21D 1/18 419/26 |
| 2004/0173335 A1 | 9/2004 | Newell et al. |

(Continued)

FOREIGN PATENT DOCUMENTS

| CN | 105562694 A | 5/2016 |
| DE | 10 2007 018 123 A1 | 10/2008 |

(Continued)

OTHER PUBLICATIONS

International Search Report for Application No. PCT/FR2019/050269 mailed May 28, 2019.
(Continued)

*Primary Examiner* — John P. Dulka
(74) *Attorney, Agent, or Firm* — McBee Moore & Vanik IP, LLC

(57) ABSTRACT

The invention relates to a process for manufacturing a part, comprising the formation of successive solid metal layers (201 . . . 20n) that are stacked on one another, each layer describing a pattern defined from a numerical model (M)), each layer being formed by depositing a metal (25), referred to as filling metal, the filling metal being subjected to an input of energy so as to melt and form said layer by solidifying, in which process the filling metal is provided in the form of a powder (25), the exposure of which to an energy beam (32) results in melting followed by solidification such that a solid layer (201 . . . 20n) is formed, the process being characterized in that the filling metal (25) is an aluminum alloy comprising at least the following alloying
(Continued)

elements: −2 to 10% by weight of Cr; −0 to 5% by weight, preferably 0.5 to 5% by weight, of Zr. The invention also relates to a part obtained by this process. The alloy used in the additive manufacturing process according to the invention makes it possible to obtain parts having remarkable mechanical properties, while obtaining a process that has an advantageous output.

11 Claims, 1 Drawing Sheet

(51) Int. Cl.
| | |
|---|---|
| B22F 10/00 | (2021.01) |
| B22F 10/25 | (2021.01) |
| B22F 10/28 | (2021.01) |
| B22F 10/36 | (2021.01) |
| B22F 10/64 | (2021.01) |
| B23K 15/00 | (2006.01) |
| B23K 26/342 | (2014.01) |
| B23K 103/10 | (2006.01) |
| B33Y 10/00 | (2015.01) |
| B33Y 40/20 | (2020.01) |
| B33Y 70/00 | (2020.01) |
| C22F 1/00 | (2006.01) |

(52) U.S. Cl.
CPC .......... B22F 10/64 (2021.01); B23K 15/0086 (2013.01); B23K 26/342 (2015.10); B33Y 10/00 (2014.12); B33Y 40/20 (2020.01); B33Y 70/00 (2014.12); C22F 1/00 (2013.01); *B22F 2003/248* (2013.01); *B22F 10/28* (2021.01); *B22F 10/36* (2021.01); *B22F 2301/052* (2013.01); *B23K 2103/10* (2018.08)

(58) Field of Classification Search
CPC .... B22F 10/28; B22F 10/36; B22F 2003/248; B22F 2301/052; B22F 3/15; B22F 5/00; B22F 7/062; B22F 2998/10; B22F 2999/00; B23K 15/0086; B23K 26/342; B23K 2103/10; B33Y 10/00; B33Y 40/20; B33Y 70/00; B33Y 30/00; B33Y 80/00; C22F 1/00; C22F 1/04; C21D 1/25; C21D 2211/004; C21D 2251/00; Y02P 10/25

See application file for complete search history.

(56) References Cited

U.S. PATENT DOCUMENTS

| | | | |
|---|---|---|---|
| 2016/0013840 A1 | 1/2016 | Murakami et al. | |
| 2017/0001609 A1 | 1/2017 | Kaltenmaier | |
| 2018/0010216 A1 | 1/2018 | Vo et al. | |
| 2020/0063242 A1* | 2/2020 | Valls Anglés | B22F 3/15 |

FOREIGN PATENT DOCUMENTS

| | | |
|---|---|---|
| EP | 2796229 A1 | 10/2014 |
| EP | 3205735 A1 | 8/2017 |
| FR | 2669844 A1 | 6/1992 |
| WO | 2015006447 A1 | 1/2015 |
| WO | 2016209652 A1 | 12/2016 |

OTHER PUBLICATIONS

French Search Report for Application No. FR1870138 mailed Dec. 13, 2018.

E. F. Kazakova, et al., "Interaction of aluminum with chromium and zirconium under equilibrium and non-equilibrium conditions," Moscow University Chemistry Bulletin, (2014), vol. 69, No. 5: 210-213.

P. Tsakiropoulos, et al., "Development of Al—Cr—X and Al—Cr—Zr—X alloys by rapid solidification from the melt," Materials Science and Engineering, (1988), vol. 98: 143-147.

Sun, S., Zheng, et al., "Characterization of Al—Fe—V—Si heat-resistant aluminum alloy components fabricated by selective laser melting," Journal of Materials Research, (2015), vol. 30, No. 10: 1661-1669. doi:10.1557/jmr.2015.110.

Sun, Shaobo, et al., "Microstructure and mechanical properties of Al—Fe—V—Si aluminum alloy produced by electron beam melting," Materials Science and Engineering A, (2016), vol. 659, 207-214.

E-384-06, Standard test Method for Microindentation Hardness of Materials11, ASTM International STAN, ASTM International, US, (Jan. 1, 2007), vol. 384, pp. 487-518, XP009142601.

* cited by examiner

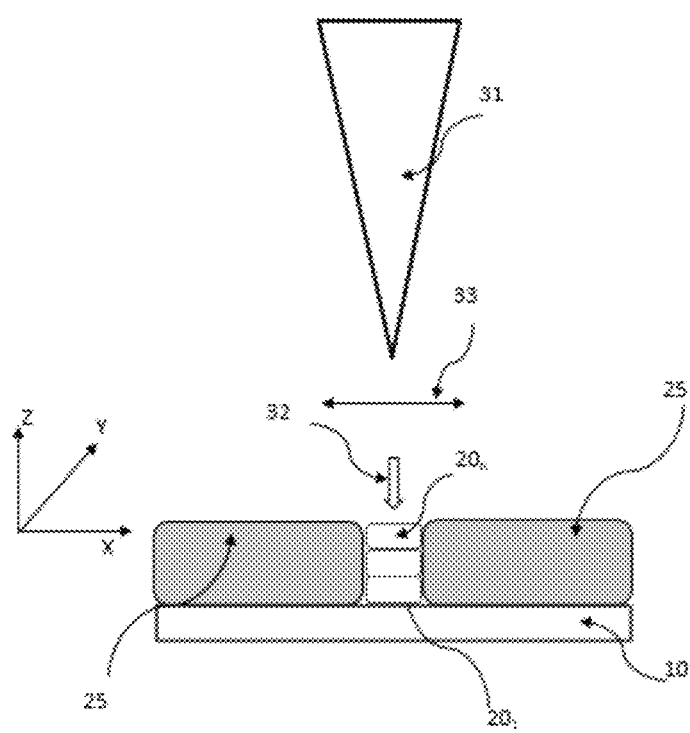

PROCESS FOR MANUFACTURING AN ALUMINUM-CHROMIUM ALLOY PART WITH SUPERIMPOSED SUCCESSIVE SOLID METALS LAYER

CROSS-REFERENCE TO RELATED APPLICATIONS

This application is the National Stage entry of International Application No. PCT/FR2019/050269, filed 7 Feb. 2019, which claims priority to French Patent Application No. 1870138, filed 8 Feb. 2018.

BACKGROUND

Field

The technical field of the invention is a method for manufacturing an aluminum alloy part, using an additive manufacturing technique.

Description of Related Art

Since the 1980s, additive manufacturing techniques have been developed. These techniques consist of forming a part by adding material, and are the opposite of machining techniques, aimed at removing material. Previously confined to prototyping, additive manufacturing is now operational for the mass production of industrial products, including metal parts.

The term additive manufacturing is defined in accordance with the French standard XP E67-001: "Set of methods for manufacturing, layer by layer, by adding material, a physical object from a digital object". The standard ASTM F2792 (January 2012) also defines additive manufacturing. Various additive manufacturing methods are also defined and described in ISO/ASTM 17296-1. Using additive manufacturing for producing an aluminum part, with low porosity, was described in the document WO 2015/006447. The application of successive layers is generally done by applying a so-called addition material, and then melting or sintering the addition material by means of an energy source of the laser beam, electron beam, plasma torch or electric arc type. Whatever the additive manufacturing method applied, the thickness of each added layer is around a few tens or hundreds of microns.

One additive manufacturing means is the melting or sintering of an addition material taking the form of a powder. It may be a case of melting or sintering by an energy beam.

Selective laser sintering (SLS) or direct metal laser sintering (DMLS) techniques are in particular known, wherein a layer of metal or metal alloy powder is applied to the part to be manufactured and is sintered selectively in accordance with the digital pattern with thermal energy from a laser beam. Another type of metal formation method comprises selective laser melting (SLM) or electron beam melting (EBM), wherein the thermal energy supplied by a laser or a directed electron beam is used for selectively melting (instead of sintering) the metal powder so that it fuses as it cools and solidifies.

Laser melting deposition (LMD) is also known, wherein the powder is sprayed and melted by a laser beam simultaneously.

The patent DE 10 2007 018 123 describes a fast prototyping method for obtaining a structure component wherein the starting material is an aluminum-scandium alloy.

The patent application WO 2016/209652 describes a method for manufacturing an aluminum with high mechanical strength comprising: the preparation of an atomized aluminum powder having one or more required approximate powder sizes and an approximate morphology; the sintering of the powder in order to form a product by additive manufacturing; dissolving; quenching; and tempering of the aluminum manufactured additively.

The patent application US 2017/0016096 describes a method for manufacturing a part by localized melting in particular obtained by the exposure of a powder to an energy beam of the electron beam or laser beam type, the powder consisting of an aluminum alloy the copper content of which is between 5% and 6% by mass, the magnesium content being between 2.5% and 3.5% by mass.

The patent application EP 2796229 discloses a method for manufacturing an aluminum metal alloy reinforced by dispersion comprising the steps consisting of: obtaining, in powder form, an aluminum alloy composition that is capable of acquiring a microstructure reinforced by dispersion; directing a low-energy-density laser beam onto a part of the powder having the composition of the alloy, removing the laser beam from the part of the powder alloy composition; and cooling the part of the powder alloy composition at a rate greater than or equal to approximately $10^{6\circ}$ C. per second, in order thus to form the aluminum metal alloy reinforced by dispersion. The method is particularly suitable for an alloy having a composition in accordance with the following formula: $Al_{comp}Fe_aSi_bX_c$, wherein X represents at least one element chosen from the group consisting of Mn, V, Cr, Mo, W, Nb and Ta; "a" ranges from 2.0% to 7.5% atomic; "b" ranges from 0.5% to 3.0% atomic; "c" ranges from 0.05% to 3.5% atomic; and the remainder is aluminum and accidental impurities, provided that the [Fe+Si]/Si ratio is situated in the range of approximately 2.0:1 to 5.0:1.

The patent application US 2016/0138400 describes alloys comprising 3% to 12% by weight iron, 0.1% to 3% by weight vanadium, 0.1% to 3% by weight silicon and 1.0% to 6% by weight copper, the remainder aluminum and impurities, suitable for additive manufacturing techniques.

The publication "Characterization of Al—Fe—V—Si heat-resistant aluminum alloy components fabricated by selective laser melting", Journal of Material Research, Vol. 30, No. 10, May 28, 2015, describes the manufacture by selective laser melting (SLM) of heat-resistant components with the composition, as a % by weight, Al-8.5Fe-1.3V-1.75i.

The publication "Microstructure and mechanical properties of Al—Fe—V—Si aluminum alloy produced by electron beam melting", Materials Science & Engineering A659 (2016)207-214, describes parts of the same alloy as in the previous article obtained by EBM.

The patent application US 2018/010216 describes alloys based on aluminum and magnesium and containing zirconium, manufactured by fast solidification methods and parts obtained by additive manufacture.

The mechanical properties of the aluminum parts obtained by additive manufacture are dependent on the alloy forming the addition material, and more precisely the composition thereof, parameters of the additive manufacturing method as well as heat treatments applied.

The inventors have determined an alloy composition which, used in an additive manufacturing method, makes it possible to obtain parts with remarkable mechanical performances, while obtaining a method the productivity of which is advantageous.

SUMMARY

A first object of the invention is a method for manufacturing a part comprising a formation of successive solid metal layers, superimposed on each other, each layer describing a pattern defined from a digital model, each layer being formed by the deposition of a metal, referred to as addition metal, the addition metal being subjected to a provision of energy so as to melt and to form, by solidifying, said layer, wherein the addition metal takes the form of a powder, the exposure of which to an energetic beam results in melting followed by solidification so as to form a solid layer, the method being characterized in that the addition metal is an aluminum alloy comprising at least the following alloy elements:

Cr, in accordance with a fraction by mass lying between 2% and 10%;
Zr, in accordance with a fraction by mass lying between 0% and 5%, preferably between 0.5% and 5%.

The addition of such a zirconium content to an alloy containing chromium makes it possible to obtain a part with improved hardness while in particular reducing the risk of cracking, which is in particular advantageous for additive manufacturing parts. This is why it is preferable for the fraction by mass of chromium to be at least 3% and preferably at least 4%. A preferred maximum fraction by mass of chromium is 8% or even 6%. A preferred minimum fraction by mass of zirconium is 0.75% and preferably 1%. A preferred maximum fraction by mass of zirconium is 3%.

The alloy may optionally comprise at least one, or even at least two elements or even at least three elements chosen from:

Mn, according to a fraction by mass of between 0.06% and 6%, preferably no more than 3% and preferably no more than 2%;
Ti, in accordance with a fraction by mass of between 0.01% and 5%, preferably at least 0.1%, preferably no more than 3%, preferentially no more than 2% and preferably no more than 1%;
V, in accordance with a fraction by mass of between 0.06% and 6%, preferably no more than 3%, preferentially no more than 2% and preferably no more than 1%.

These elements can lead to the formation of dispersoids or fine intermetallic phases making it possible to increase the hardness of the material obtained. These elements may also have a beneficial effect on the thermal stability of the alloy by increasing the temperature or duration necessary for reaching the hardness peak.

The alloy may also comprise at least one, or even at least two elements or even at least three elements chosen from:

Ag, in accordance with a fraction by mass of between 0.06% and 1%;
Li, in accordance with a fraction by mass of between 0.06% and 1%;
Cu, in accordance with a fraction by mass of between 0.06% and 5%, the Cu content being less than the Cr content and preferably between 0.1% and 2%;
Zn, in accordance with a fraction by mass of between 0.06% and 1%.

The elements Ag, Cu, Zn and Li can act on the strength of the material by hardening precipitation or through their effect on the properties of the solid solution.

Optionally it is possible to add at least one element chosen from Sc, Hf, W, Nb, Ta, Y, Yb, Nd, Er, Co, Ni with a fraction by mass of at least 0.06% and no more than 5%, preferably no more than 3%, preferentially no more than 2% and preferably no more than 1%, so as to form more dispersoids or fine intermetallic phases. However, in one embodiment, the addition of Sc is avoided, the preferred fraction by mass then being less than 0.05% and preferably less than 0.01%.

Optionally it is possible to add at least one element chosen from La, Ce or mischmetal, with a fraction by mass of at least 0.06% and no more than 6%, preferentially no more than 3%, preferably no more than 2% and preferably no more than 1%.

Optionally it is possible to add at least one element chosen from W, Mo, In, Bi, Sr, Sn, Ba, Ca, Sb, P and B, with a fraction by mass of at least 0.01% and no more than 1% and preferably at least 0.06% and no more than 0.8%. However, in one embodiment, the addition of Bi is avoided, the preferred fraction by mass then being less than 0.05% and preferably less than 0.01%.

The alloy may also comprise Mg in accordance with a fraction by mass of at least 0.06% and no more than 0.5%. However, the addition of Mg is not recommended and the Mg content is preferably maintained below an impurity value of 0.05% by mass.

It is possible to intentionally add to the alloy Fe and/or Si in accordance with a fraction by mass of at least 0.06% and no more than 1% each, and preferably at least 0.1% and no more than 2% each, and preferably at least 0.5% and no more than 1% each, which can provide additional hardening by the formation of dispersoids. The Fe and/or Si content may also be related in certain cases to the cost of the alloy, it may in fact be favorable not to use an excessively pure starting metal. In one embodiment the Fe and/or Si content is maintained below or equal to a level of 0.5% and preferably 0.2%, which makes it possible to use a less pure alloy without any risk of increasing the mechanical characteristics in the as-manufactured state, which would lead to problems of distortion and/or cracking of the part.

The material comprises a fraction by mass of other elements or impurities below 0.05%, that is to say 500 ppm. The total fraction by mass of the other elements or impurities is less than 0.15%. An element that is not selected as an addition element comprises a fraction by mass of less than 0.05%, or even less according to the preferred proportion of this addition.

In a preferred embodiment of the invention, the aluminum alloy consists of, as a fraction by mass, at least 2% and no more than 10% and preferably at least 3% and no more than 9% Cr, at least 0.5% and no more than 6% and preferably at least 0.75% and no more than 3% Zr, at least 0.06% and no more than 6% and preferably at least 0.5% and no more than 4% Mn, no more than 0.5% Fe and Si, other elements or impurities less than 0.05%, the total fraction by mass of the other elements or impurities being less than 0.15%.

The powder can be obtained by conventional atomization methods from an alloy according to the invention in liquid or solid form or, alternatively, the powder can be obtained by mixing primary powders before exposure to the energy beam, the various compositions of the primary powders having a mean composition corresponding to the composition of the alloy according to the invention.

It is also possible to add infusible, preferably nanometric, particles, for example oxides or $TiB_2$ particles or carbon nanoparticles, before preparation of the powder by atomization and/or when the powder is deposited and/or when the primary powders are mixed. However, in one embodiment of the invention, infusible particles are not added.

According to one embodiment, the method comprises, following the formation of the layers:

heat treatment typically at a temperature of at least 100° C. and no more than 550° C. and preferably higher than 300° C. or preferentially higher than 350° C.

and/or hot isostatic compression or HIC.

The heat treatment may in particular afford a detensioning of the residual stresses and/or an additional precipitation of hardening phases.

The HIC treatment in particular improves the elongation properties and the fatigue properties. Hot isostatic compression may also be carried out before, after or in place of the heat treatment.

Advantageously, the hot isostatic compression is carried out at a temperature of between 250° C. and 550° C. and preferably between 300° C. and 500° C., or preferentially higher than 350° C., at a pressure of between 500 and 300 bar and for a period of between 1.5 and 10 hours.

The heat treatment and/or the hot isostatic compression in particular increases the hardness of the product obtained.

According to another embodiment suited to structural-hardening alloys, it is possible to carry out a solution heat treatment followed by quenching and annealing of the part formed and/or hot isostatic compression. The hot isostatic compression may in this case advantageously be substituted for the solution heat treatment. However, the method according to the invention is advantageous since it preferably does not require any solution heat treatment followed by quenching. The solution heat treatment may have a detrimental effect on the mechanical strength in certain cases by participating in an enlarging of the dispersoids or of the fine intermetallic phases.

According to one embodiment, the method according to the invention further optionally comprises a machining treatment, and/or chemical, electrochemical or mechanical surface treatment, and/or tribofinishing. These treatments may be carried out in particular in order to reduce the roughness and/or to improve the corrosion resistance and/or to improve resistance to the initiation of fatigue cracks.

Optionally, it is possible to perform a mechanical deformation of the part at a stage of the manufacturing method, for example after the additive manufacturing and/or before the heat treatment.

A second object of the invention is a metal part, obtained after application of a method according to the first object of the invention.

Other advantages and features will emerge more clearly from the following description and non-limitative examples, and depicted in the figure listed below.

Yet another object of the invention is a method for manufacturing a part comprising a formation of successive solid metal layers, superimposed on one another, in order to form an untreated part, each layer describing a pattern defined from a digital model, each layer being formed by the deposition of a metal, referred to as addition metal, the addition metal being subjected to a provision of energy so as to melt and to form, by solidifying, said layer, wherein the addition metal takes the form of a powder, the exposure of which to an energetic beam results in melting followed by solidification so as to form a solid layer, the addition metal being an aluminum alloy having an Mg content of less than 0.5% by weight, the method being characterized in that the untreated part preferentially has a Knoop hardness of between 100 HK and 200 HK and in that the untreated part is next heat treated and/or subjected to hot isostatic compression at a temperature above 350° C. so as to increase its Knoop hardness by at least 20 HK. In this embodiment the alloy preferably has a composition according to the first object of the invention.

BRIEF DESCRIPTION OF THE DRAWINGS

The figure is a diagram illustrating an additive manufacturing method of the selective laser melting (SLM) or EBM type.

DETAILED DESCRIPTION OF A PREFERRED EMBODIMENT

In the description, unless indicated to the contrary:

the designation of the aluminum alloys is in accordance with the naming established by The Aluminum Association;

the proportions of chemical elements are designated as % and represent fractions by mass;

the hardnesses are evaluated by the Knoop method for a load of 0.01 kg (10 g), the term Knoop hardness 0.01 or Knoop hardness being used indifferently.

The figure describes in general terms an embodiment wherein the additive manufacturing method according to the invention is used. According to this method, the addition material 25 is in the form of an alloy powder according to the invention. An energy source, for example a laser source or a source of electrons 31 emits an energy beam, for example a laser beam or a beam of electrons 32. The energy source is coupled to the addition material by an optical system or electromagnetic lenses 33, the movement of the beam thus being able to be determined according to a digital model M. The energy beam 32 follows a movement along the longitudinal plane XY, describing a pattern dependent on the digital model. The powder 25 is deposited on a support 10. The interaction of the energy beam 32 with the powder 25 causes a selective melting of the latter, followed by solidification, resulting in the formation of a layer $20_1 \ldots 20_n$. When a layer has been formed, it is covered with powder 25 of the addition metal and another layer is formed, superimposed on the layer previously produced. The thickness of the powder forming a layer may for example be between 10 and 100 μm. This additive manufacturing mode is typically known by the term selective laser melting (SLM) when the energy beam is a laser beam, the method advantageously being executed at atmospheric pressure, and by the name electron beam melting (EBM) when the energy beam is a beam of electrons, the method advantageously being executed under reduced pressure, typically less than 0.01 bar and preferably less than 0.1 mbar.

Preferably, in particular in the case where selective laser melting is used, use is made of a heated plate in order to improve processability and to prevent cracking. The plate can preferably be heated to a temperature of 50° to 300° C., more preferentially 100° to 250° C.

In another embodiment, the layer is obtained by selective laser sintering (SLS) or direct metal laser sintering (DMLS), the layer of alloy powder according to the invention being sintered selectively in accordance with the digital model with thermal energy supplied by a laser beam.

In yet another embodiment, not described by the figure, the powder is sprayed and melted by a beam, generally laser, simultaneously. This method is known by the term laser melting deposition.

Methods known in particular by the names direct energy deposition (DED), direct metal deposition (DMD), direct laser deposition (DLD), laser deposition technology (LDT), laser metal deposition (LMD), laser engineering net shaping (LENS), laser cladding technology (LCT), and laser free-form manufacturing technology (LFMT).

In one embodiment the method according to the invention is used for producing a hybrid part comprising a part obtained by conventional rolling and/or spinning and/or molding and/or forging optionally followed by machining and an attached part obtained by additive manufacturing. This embodiment may also be suitable for repairing parts obtained by the conventional methods.

In one embodiment of the invention it is also possible to use the method according to the invention for repairing parts obtained by additive manufacture.

At the end of formation of the successive layers, an untreated part or a part in the as-manufactured state is obtained.

The metal parts obtained by the method according to the invention are particularly advantageous since they have smooth surfaces, do not have a hot cracking, have a hardness that is not too high in the as-manufactured state but which can increase significantly through heat treatment. Advantageously, the hardness in the as-manufactured state is lower than the hardness after heat treatment and/or hot isostatic compression, the Knoop hardness difference being at least 10 HK, preferably at least 20 HK, preferably at least 30 HK and preferentially at least 40 HK. Thus, unlike the alloys of the prior art, such as the 8009 alloy, the Knoop hardness in the as-manufactured state is preferably less than 300 HK and advantageously less than 200 HK, and preferably less than 150 HK. Advantageously the Knoop hardness in the as-manufactured state is at least 50 HK, advantageously at least 80 HK, and preferably at least 90 HK. In one embodiment of the invention the Knoop hardness in the as-manufactured state is between 100 HK and 200 HK. Preferably, the metal parts according to the invention are characterized, after heat treatment of at least 100° C. and no more than 550° C. and/or hot isostatic compression, by a 0.01 Knoop hardness of at least 100 HK and preferably at least 120 HK or even at least 140 HK and preferentially at least 150 HK and by the absence of hot cracking.

The present inventor found that a method for manufacturing a part comprising formation of successive solid metal layers, superimposed on one another, in order to form an untreated part, each layer describing a pattern defined from a digital model, each layer being formed by the deposition of a metal, referred to as an addition metal, the addition metal being subjected to a provision of energy so as to melt and to form, by solidifying, said layer, wherein the addition metal takes the form of a powder, the exposure of which to an energetic beam results in melting followed by solidification so as to form a solid layer, the addition metal being an aluminum alloy as described above having an Mg content of less than 0.5% by weight, the method being characterized in that the untreated part preferably has a Knoop hardness of between 100 HK and 200 HK and in that it is next heat treated and/or subjected to hot isostatic compression at a temperature above 350° C. so as to increase the Knoop hardness thereof by at least 20 HK is particularly advantageous.

The invention will be described in more detail in the following example.

The invention is not limited to the embodiments described in the above description or in the following examples, and may vary widely in the context of the invention as defined by the claims accompanying the present description.

EXAMPLE

Example 1

In this example the properties of various alloys were evaluated in a selective laser melting (SLM) machine.

8009 or AS7G06 alloy discs or ones made from an alloy according to the invention, with a thickness of 5 mm and a diameter of 27 mm, were prepared from small ingots. The discs were placed in a selective laser melting (SLM) machine and the surface was swept with a laser with the same sweeping strategy and method conditions representative of those used for the selective laser melting (SLM) method. The present inventor in fact found that it was possible in this way to evaluate the suitability of the alloys for the selective laser melting (SLM) method and in particular the surface quality and the sensitivity to hot cracking.

The composition of the alloys used is given in table 1 below.

TABLE 1

| Alloy | Si | Fe | Mn | V | Cr | Zr | Mg | Ti |
|---|---|---|---|---|---|---|---|---|
| Invention | 0.05 | 0.16 | 1.0 | | 4.9 | 1.5 | | |
| 8009 | 1.8 | 8.7 | 0.23 | 1.3 | | | | |
| AS7G06* | 7.0 | | | | | | 0.6 | 0.2 |

*nominal values

In the following tests, the laser source had a power of 200 W, the width of a laser passage being 100 μm, with an overlap between two successive passages, the manufacturing temperature was 200° C. The sweep speed was 900 mm/s. A Phenix Systems PM100 selective laser melting (SLM) machine was used.

The surface quality was evaluated qualitatively according to the following scale, the mark 1 being the most favorable.
1: very smooth surface without surface defects
2: smooth surface without surface defects
3: rough surface without surface defects
4: very rough surface with surface defects.

Sensitivity to hot cracks was assessed on cross sections of the treated zones in accordance with the following scale, the mark 1 being the most favorable.
1: absence of microcracks
2: presence of microcracks of less than 50 μm
3: presence of microcracks of more than 50 μm.

Hardness was measured according to the Knoop scale with a load of 10 g after laser treatment and after additional heat treatment at 400° C., making it possible in particular to assess the suitability of the alloy for hardening during heat treatment and the effect of any HIP treatment on the mechanical properties.

The results obtained are presented in table 2 below.

TABLE 2

| Alloy | Surface assessment | Hot-cracking assessment | Knoop hardness (0.01) after laser treatment | Knoop hardness (0.01) after additional treatment for 4 hours at 400° C. |
|---|---|---|---|---|
| Invention | 1 | 1 | 118 HK | 162 HK |
| 8009 | 4 | 3 | 360 HK | 155 HK |
| AS7G06 | 1 | 1 | 132 HK | 72 HK |

The alloy according to the invention is particularly advantageous since it makes it possible to obtain a smooth surface, without hot cracking and with high hardness after treatment at 400° C.

Example 2

An alloy according to the present invention having the composition as presented in table 3 below, in percentages by weight, was prepared.

TABLE 3

| Alloy | Mn | Cr | Zr |
|---|---|---|---|
| Invention | 1.0 | 5 | 2 |

5 kg of alloy powder was atomized successfully using a VIGA (vacuum inert gas atomization) atomizer. The powder was used successfully in a selective laser melting machine of the FormUp 350 model for producing tensile test blanks. The tests were carried out with the following parameters: layer thickness: 60 μm, laser power: 370 W-390 W, heating of plate: 200° C., vector difference: 0.11-0.13, laser speed: 1000-1400 mm/s. The blanks were cylindrical with a height of 45 mm and a diameter of 11 mm for the tensile tests in the manufacturing direction (Z direction), and 12×45×45 mm³ parallelepipedal blocks for the tests in the XY direction (perpendicular to the manufacturing direction). After manufacture by selective laser melting (SLM), the blanks were subjected to a relaxation heat treatment of 2 hours at 300° C. Some blanks were tested in the pre-relaxation state and other blanks were subjected to an additional treatment for 1 hour or 4 hours at 400° C. (hardening annealing).

Cylindrical test pieces were machined from the blanks described above. Tensile tests were carried out at ambient temperature in accordance with NF EN ISO 6892-1 (2009-10) and ASTM E8-E8M-13a (2013).

TABLE 4

| Direction | Heat treatment | Rp0.2 (MPa) | Rm (MPa) | A % |
|---|---|---|---|---|
| Z | Untreated state | 301 to 333 | 356 to 380 | 2.6 to 6.7 |
| Z | 1 h at 400° C. | 377 to 396 | 425 to 438 | 2.9 to 3.3 |
| XY | Untreated state | 332 to 365 | 380 to 403 | 6.7 to 11.2 |
| XY | 1 h at 400° C. | 392 to 428 | 434 to 463 | 2.6 to 6.7 |
| XY | 4 h at 400° C. | 409 to 437 | 452 to 474 | 3.1 to 5.1 |

The heat treatment leads to a significant increase in the mechanical strength compared with the untreated state, associated with a reduction in elongation. The alloy according to the present invention therefore makes it possible to dispense with a conventional heat treatment of the solution heat treatment/quenching type.

The invention claimed is:

1. A method for manufacturing a part comprising a formation of successive solid metal layers, superimposed on each other, each layer describing a pattern defined from a digital model (M), each layer being formed by the deposition of a metal, referred to as addition metal, the addition metal being subjected to a provision of energy so as to melt and to form, by solidifying, said layer, wherein the addition metal takes the form of a powder, the exposure of which to an energetic beam results in melting followed by solidification so as to form a solid layer, wherein the addition metal is an aluminum alloy comprising at least the following alloy elements:
Cr, in accordance with a fraction by mass lying between 2% and 10%;
Zr, in accordance with a fraction by mass lying between 0% and 5%, optionally between 0.5% and 5%.

2. The method according to claim 1, wherein the aluminum alloy comprises at least one of the following elements:
Mn, according to a fraction by mass of between 0.06% and 6%, optionally no more than 3% and optionally no more than 2%;
Ti, in accordance with a fraction by mass of between 0.01% and 5%, optionally at least 0.1%, optionally no more than 3%, optionally no more than 2% and optionally no more than 1%;
V, in accordance with a fraction by mass of between 0.06% and 6%, optionally no more than 3%, optionally no more than 2% and optionally no more than 1%.

3. The method according to claim 1, wherein the aluminum alloy comprises at least one of the following elements:
Ag, in accordance with a fraction by mass of between 0.06% and 1%;
Li, in accordance with a fraction by mass of between 0.06% and 1%;
Cu, in accordance with a fraction by mass of between 0.06% and 5%, the Cu content being less than the Cr content and optionally between 0.1% and 1%;
Zn, in accordance with a fraction by mass of between 0.06% and 1%.

4. The method according to claim 1, wherein the aluminum alloy also comprises at least one of the following elements Sc, Hf, W, Nb, Ta, Y, Yb, Nd, Er, Co, Ni with a fraction by mass of at least 0.06% and no more than 5%, optionally no more than 3%, optionally no more than 2% and optionally no more than 1%, so as to form more dispersoids or fine intermetallic phases.

5. The method according to claim 1, wherein the aluminum alloy also comprises at least one of the following elements
La, Ce or mischmetal, with a fraction by mass of at least 0.06% and no more than 6%, optionally no more than 3%, optionally no more than 2% and optionally no more than 1%.

6. The method according to claim 1, wherein the aluminum alloy also comprises at least one of the following elements
W, Mo, In, Bi, Sr, Sn, Ba, Ca, Sb, P and B, with a fraction by mass of at least 0.01% and no more than 1% and optionally at least 0.06% and no more than 0.8%.

7. The method according to claim 1, wherein the aluminum alloy also comprises the element Mg in accordance with a fraction by mass of at least 0.06% and no more than 0.5%.

8. The method according to claim 1, wherein the aluminum alloy also comprises Fe and/or Si in accordance with a fraction by mass of at least 0.06% and no more than 1% each, and optionally at least 0.1% and no more than 2% each, and optionally at least 0.5% and no more than 1% each.

9. The method according to claim 1, comprising, following the formation of the layers,
a heat treatment typically at a temperature of at least 100° C. and no more than 550° C.,
and/or a hot isostatic compression.

10. The method according to claim 9, wherein the hardness in an as-manufactured state is less than the hardness after heat treatment and/or hot isostatic compression, the difference in Knoop hardness being at least 10 HK.

11. The method for manufacturing a part comprising a formation of successive solid metal layers, superimposed on each other, in order to form an untreated part, each layer describing a pattern defined from a digital model, each layer being formed by the deposition of a metal, referred to as addition metal, the addition metal being subjected to a provision of energy so as to melt and to form, by solidifying, said layer, wherein the addition metal takes the form of a powder, the exposure of which to an energetic beam results in melting followed by solidification so as to form a solid layer, the addition metal being an aluminum alloy of claim

1 having an Mg content of less than 0.5% by weight, wherein the untreated part optionally has a Knoop hardness of between 100 HK and 200 HK and the untreated part is next heat treated and/or subjected to hot isostatic compression at a temperature above 350° C. so as to increase Knoop hardness by at least 20 HK.

* * * * *